United States Patent
Taira et al.

(10) Patent No.: US 8,803,997 B2
(45) Date of Patent: *Aug. 12, 2014

(54) METHOD AND DEVICE FOR CONTROLLING REMOTE CAPTURING OF AN IMAGE BASED ON DETECTION OF A PREDETERMINED CHANGE IN THE IMAGE

(75) Inventors: Katsunobu Taira, Daito (JP); Haruyoshi Oshinome, Daito (JP)

(73) Assignee: Kyocera Corporation, Kyoto (JP)

( * ) Notice: Subject to any disclaimer, the term of this patent is extended or adjusted under 35 U.S.C. 154(b) by 102 days.

This patent is subject to a terminal disclaimer.

(21) Appl. No.: 13/131,594

(22) PCT Filed: Nov. 25, 2009

(86) PCT No.: PCT/JP2009/069870

§ 371 (c)(1),
(2), (4) Date: Aug. 18, 2011

(87) PCT Pub. No.: WO2010/061850

PCT Pub. Date: Jun. 3, 2010

(65) Prior Publication Data

US 2011/0294545 A1 Dec. 1, 2011

(30) Foreign Application Priority Data

Nov. 26, 2008 (JP) ................................. 2008-300761

(51) Int. Cl.
*H04N 5/228* (2006.01)

(52) U.S. Cl.
USPC ....................................................... 348/222.1

(58) Field of Classification Search
USPC .......................................... 348/364; 382/190
See application file for complete search history.

(56) References Cited

U.S. PATENT DOCUMENTS

| 8,285,108 B2* | 10/2012 | Fukuda ......................... 386/228 |
| 2004/0218916 A1* | 11/2004 | Yamaguchi et al. .......... 396/263 |
| 2007/0064091 A1 | 3/2007 | Park |
| 2007/0195174 A1* | 8/2007 | Oren ........................... 348/222.1 |
| 2007/0274703 A1* | 11/2007 | Matsuda ....................... 396/264 |
| 2008/0309796 A1* | 12/2008 | Abe ........................... 348/231.99 |
| 2008/0317455 A1* | 12/2008 | Abe .............................. 396/263 |
| 2009/0167883 A1 | 7/2009 | Nozaki |

FOREIGN PATENT DOCUMENTS

| JP | 2002-290529 | 10/2002 |
| JP | 2003-224761 | 8/2003 |

(Continued)

OTHER PUBLICATIONS

International Search Report for PCT/JP2009/069870, mailed on Dec. 22, 2009, 4 pages.

*Primary Examiner* — Gary C Vieaux
(74) *Attorney, Agent, or Firm* — Duane Morris LLP

(57) ABSTRACT

A portable telephone is provided with a camera module (13) for outputting a captured image as image information, a memory (105) for storing the image information, a face registration unit (504) for holding information relating to a face image, a face extraction unit (501), a face parameter extraction unit (502), and a matching determination unit (505) which serve as the configuration for detecting the face image held in the face registration unit (504) from the captured image, and an image-capturing control unit (506) for executing control processing for image capturing. The image-capturing control unit (506) stores the image information in the memory (105) on the basis of the fact that after the face image held in the face registration unit (504) is detected, the face image becomes undetected, and the face image is then detected again.

14 Claims, 16 Drawing Sheets

(56) References Cited

FOREIGN PATENT DOCUMENTS

| | | |
|---|---|---|
| JP | 2005-051472 | 2/2005 |
| JP | 2007-041205 | 2/2007 |
| JP | 2007-052780 | 3/2007 |
| JP | 2007-281760 | 10/2007 |
| JP | 2008-042319 | 2/2008 |
| JP | 2008-160280 | 7/2008 |

* cited by examiner

Automatic image-capture process

Automatic setting of remote image-capture mode

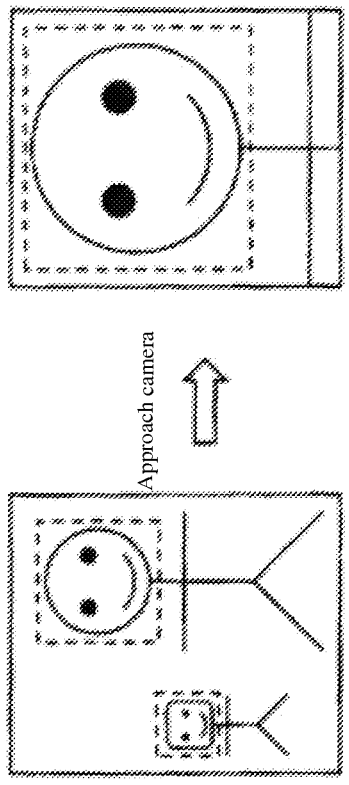
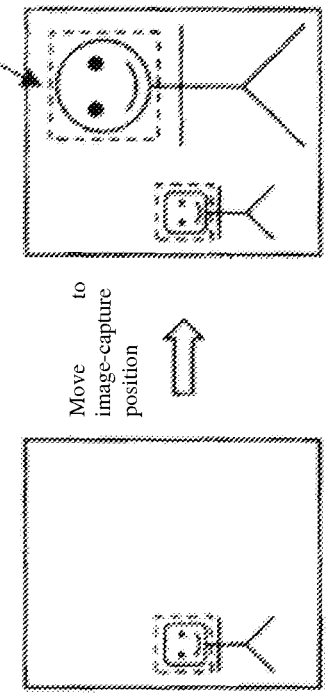
Figure 12A
Automatic setting of remote image capture
Figure 12B
Automatic release of remote image capture

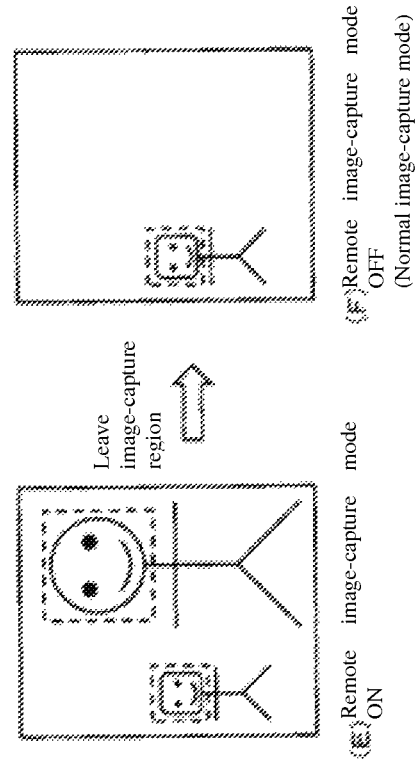
Figure 12C Automatic release of remote image capture

METHOD AND DEVICE FOR CONTROLLING REMOTE CAPTURING OF AN IMAGE BASED ON DETECTION OF A PREDETERMINED CHANGE IN THE IMAGE

CROSS-REFERENCE TO RELATED APPLICATIONS

This application is the national phase of PCT application PCT/JP2009/069870 having an international filing date of 25 Nov. 2009, which claims benefit of Japanese application No. 2008-300761 filed 26 Nov. 2008. The contents of the above patent applications are incorporated by reference herein in their entirety.

TECHNICAL FIELD

The present invention is related to devices with camera such as cellular phones with camera, PDAs (Personal Digital Assistant) with camera, and digital cameras, etc.

BACKGROUND ART

Conventionally, a device with camera normally comprises a self-timer function. This self-timer function is an automatic image-capture function used when there is nobody to press the shutter. When the shutter button is pressed while the self-timer has been set, the shutter clicks after a set time, and the captured image is saved in a memory. After pressing the shutter button, the user moves to the position being captured, prepares for image capture and waits for the shutter to click.

However, when using the self-timer function, there are time constraints. Consequently, if one is slow to prepare for image capture for some reason, the shutter may click before preparation is complete. In this case, it is necessary to reset the self-timer to perform image capture.

At the same time, such devices with camera comprise a control function provided by a remote control that enables remote operation using the remote control to click the shutter (i.e., a remote-shutter function) (e.g., Patent Document 1).

When performing image-capture operations using a remote control in this way, it is possible to click the shutter at the photographer's desired timing after sufficiently preparing for image capture.

Furthermore, devices with camera that detect a subject's face and their facial expression and automatically click the shutter according to facial expressions or movements have recently been developed (e.g., Patent Document 2).

PRIOR ART DOCUMENT

Patent Document

Patent Document 1: Japanese published unexamined application 2007-41205 [G03B 17/38]
Patent Document 2: Japanese published unexamined application 2008-42319 [H04N 5/232]

SUMMARY OF THE INVENTION

The objective of the present invention is to provide a device with camera that allows a shutter operation to be performed at a desired timing and provides excellent operability.

BRIEF DESCRIPTION OF DRAWINGS

FIG. 12A is an explanatory diagram of the automatic settings in a remote image-capture mode according to one embodiment.

FIG. 12B is an explanatory diagram of the flow of an automatic release in a remote image-capture mode according to one embodiment.

FIG. 12C is an explanatory diagram of the flow of an automatic release in a remote image-capture mode according to one embodiment.

EXPLANATION OF REFERENCES

13: Camera module (camera part)
105: Memory (memory part)
501: Face extraction part (face detection part)
502: Face-parameter extraction part (face detection part)
504: Face registration part
505: Matching judgment part (face detection part)
506: Image-capture control part (face detection part, remote memory part)
511: Target identification part (face detection part)
512: Target-tracking part (face detection part, tracking part)
513: Face-presence detection part (face detection part)
521: State detection part
531: Mode control part

EMBODIMENTS FOR CARRYING OUT THE INVENTION

First Practical Example of the Present Invention

Figure 1A:
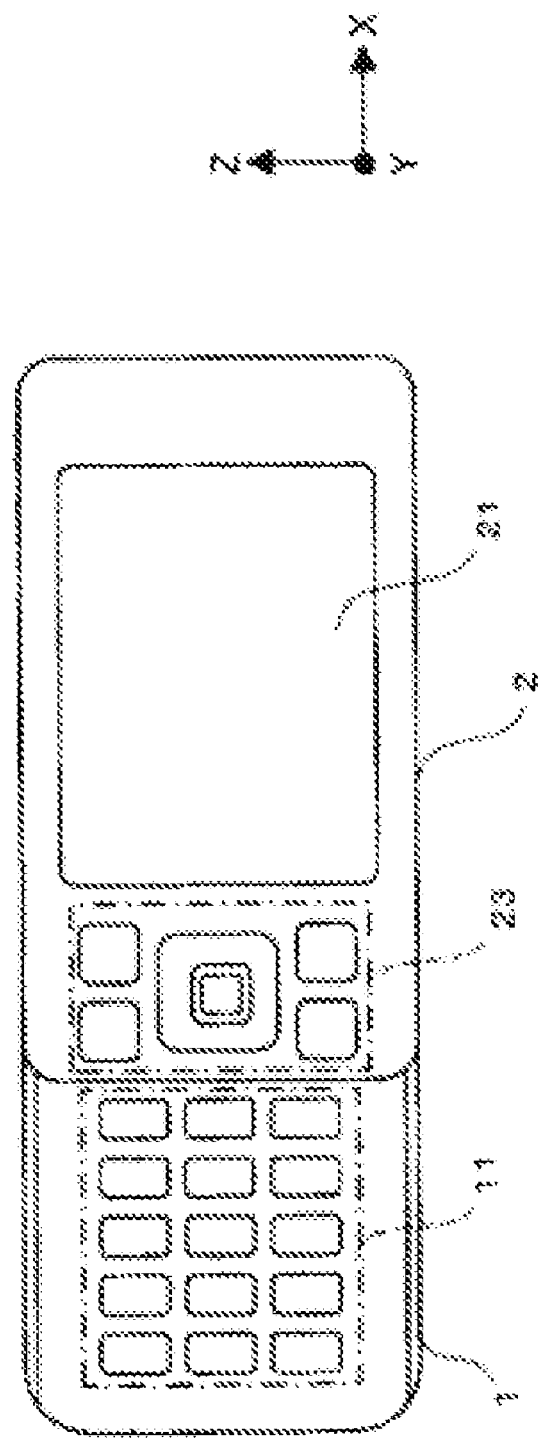
FIG. 1A is a front view of the external configuration of a cellular phone according to one embodiment.
Figure 1B:
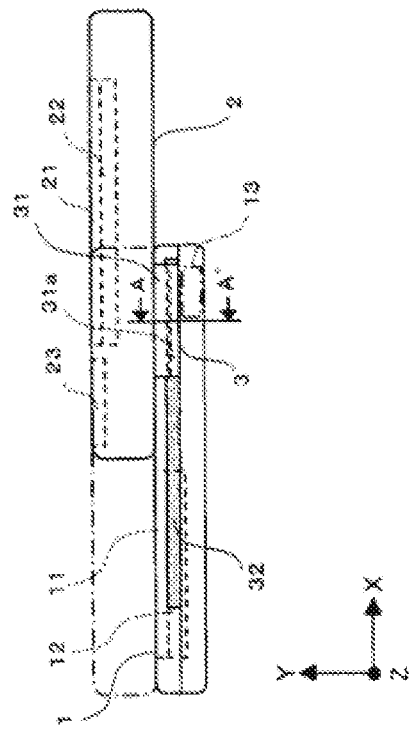
FIG. 1B is a lateral view of the external configuration of a cellular phone according to one embodiment.
Figure 1C:
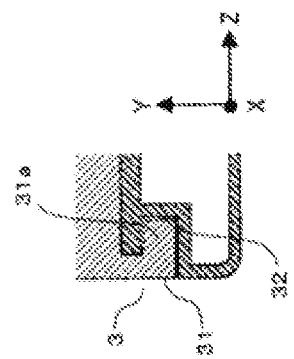
FIG. 1C is a cross-sectional diagram along the line A-A' of the external configuration of a cellular phone according to one embodiment.

The following is a description of an embodiment of the present invention with reference to the drawings. FIG. 1 is a diagram showing the external configuration of a cellular phone, FIG. 1A is a front view of the cellular phone in a state in which a second cabinet is open, and FIG. 1B is a lateral view in the same state. FIG. 1C is a cross-sectional diagram along the line A-A' in FIG. 1B.

The cellular phone comprises a first cabinet 1 and the second cabinet 2. A numeric keypad part 11 is arranged on the front-surface side of the first cabinet 1. The numeric keypad part 11 comprises multiple numerical and character keys, a call-starting key, and a call-ending key, etc. A backlight device 12 (hereinafter referred to as "key backlight") is arranged on the rear of the numeric keypad part 11. The key backlight 12 comprises an LED that acts as a light source, and feeds light to the numeric keypad part 11. As a result, the user is able to see the displays attached to each key even when the surroundings are dark.

A camera module 13 is arranged inside the first cabinet 1. The lens window (not illustrated) of the camera module 13 is arranged on the rear surface of the first cabinet 1, and from this lens window, an image of the subject is downloaded into the camera module 13.

A display 21 with a vertically long rectangular shape is arranged on the front-surface side of the second cabinet 2, and the display surface thereof is arranged on the front surface. This display 21 may be configured using, for example, a liquid crystal panel or an organic EL, etc. A backlight device 22 (hereinafter referred to as "panel backlight") is arranged on the rear of the display 21. The panel backlight 22 comprises an LED that acts as a light source, and feeds light to the display 21.

Furthermore, a main-key part 23 is arranged on the front-surface side of the second cabinet 2. On the main-key part 23, mode keys for activating various functional modes (Camera mode, E-mail mode, Internet mode, Address-book mode), movement keys for scrolling through a screen or moving a highlight focus, and an Enter key for performing various determination operations.

The numeric keypad part 11 and the main-key part 23 may be realized using a touch panel or a touch sensor.

The second cabinet 2 is connected to the first cabinet tin a manner allowing it to slide in the X-axis direction in FIG. 1 using a slide mechanism part 3. As shown in FIG. 1C, the slide mechanism 3 comprises a guide board 31 and a guide groove 32. The guide board 31 is provided on both the left and right ends of the rear surface of the second cabinet 2, and comprises a protrusion 31a on the lower end. The guide groove 32 is formed on the lateral surface of the first cabinet 1 along the sliding direction (X-axis direction in FIG. 1). The protrusion 31a of the guide board 31 is engaged with the guide groove 32.

As indicated by the dashed line in FIG. 1B, when the cellular phone is closed, the second cabinet 2 almost completely overlaps the first cabinet 1. In this state (closed state), all of the keys on the front surface of the numeric keypad part 11 are hidden behind the second cabinet 2. The second cabinet 2 is able to slide until the guide board 31 reaches the end position of the guide groove 32 (i.e., enter an open state). When the second cabinet 2 is completely open, as shown in FIG. 1A, all of the keys of the numeric keypad part 11 are externally exposed.

Figure 2:
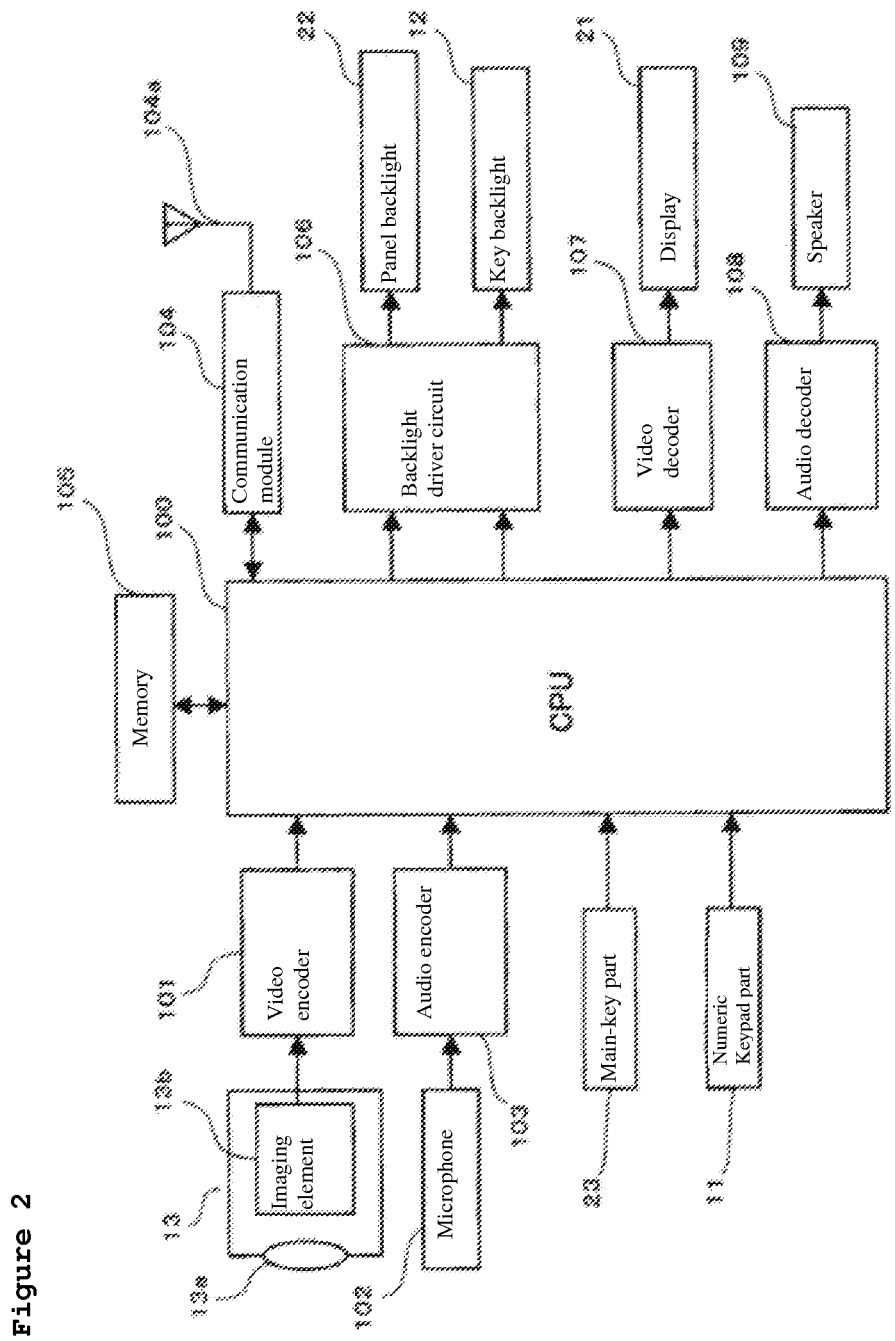
FIG. 2 is a block diagram showing the overall configuration of a cellular phone according to an embodiment.

FIG. 2 is a block diagram showing the overall configuration of the cellular phone. In addition to each component described above, the cellular phone of the present embodiment comprises a CPU 100, a video encoder 101, a microphone 102, an audio encoder 103, a communication module 104, a memory 105, a backlight driver circuit 106, a video decoder 107, an audio decoder 108, and a speaker 109.

The camera module 13 comprises an imaging lens 13a, and an imaging element 13b, etc. The imaging lens 13a forms an image of a subject on the imaging element 13b. The imaging element 13b comprises, for example, a CCD, and generates and outputs image signals according to the downloaded image to the video encoder 101. The video encoder 101 converts the image signals from the imaging element 13b into digital image signals that can be processed by the CPU 100, and outputs the signals to the CPU 100.

The microphone 102 outputs audio signals into electrical signals and outputs the signals to the audio encoder 103. The audio encoder 103 converts the audio signals from the microphone 102 into digital signals that can be processed by the CPU 100, and outputs the signals to the CPU 100.

The communication module 104 converts the audio signals and image signals and text signals, etc. from the CPU 100 into radio signals and sends the signals to a base station via an antenna 104a. The communication module 104 also converts radio signals received via the antenna 104a into audio signals, image signals and text signals, etc. and outputs the signals to the CPU 100.

The memory 105 includes a ROM and a RAM. The memory 105 stores a control program for granting control functions to the CPU 100. Moreover, image data captured using the camera module 24, image data downloaded from an external source via the communication module 104, and text data (E-mail data), etc. are saved in the memory 105 in prescribed file formats.

The backlight driver circuit 106 feeds voltage signals corresponding to control signals from the CPU 100 to the panel backlight 22 and the key backlight 12.

The video decoder 107 converts video signals from the CPU 100 into analog video signals that can be displayed on the display 21, and outputs the signals to the display 21.

The audio decoder 108 converts audio signals from the CPU 100 into analog audio signals that can be output from the speaker 109, and outputs the signals to the speaker 109. The speaker 109 plays the audio signals from the audio decoder 108 as audio.

By outputting control signals to parts such as the communication module 104, the video decoder 107, and the audio decoder 108, etc. based on input signals from parts such as the camera module 13, the microphone 102, the main-key part 23, and the numeric keypad part 11, etc., the CPU 100 performs processes for various functional modes.

For example, when the mode key for Camera mode is pressed, the CPU 100 activates the camera. In this Camera mode, images sent from the camera module 13 are displayed on the display 21 as preview images. Because several tens of frames are sent every second from the camera module 13, images are displayed on the display 21 in a video-like manner.

When the user presses a shutter key (assigned to, for example, the Enter key), the CPU 100 stores the image captured at that timing in the memory 105 in a prescribed file format such as JPEG, etc.

The cellular phone of the present embodiment comprises a function for a remote image-capture mode as one function of the Camera mode. When the user is joining the photograph being captured, the remote image-capture mode can be activated by performing a prescribed key operation.

Figure 3:
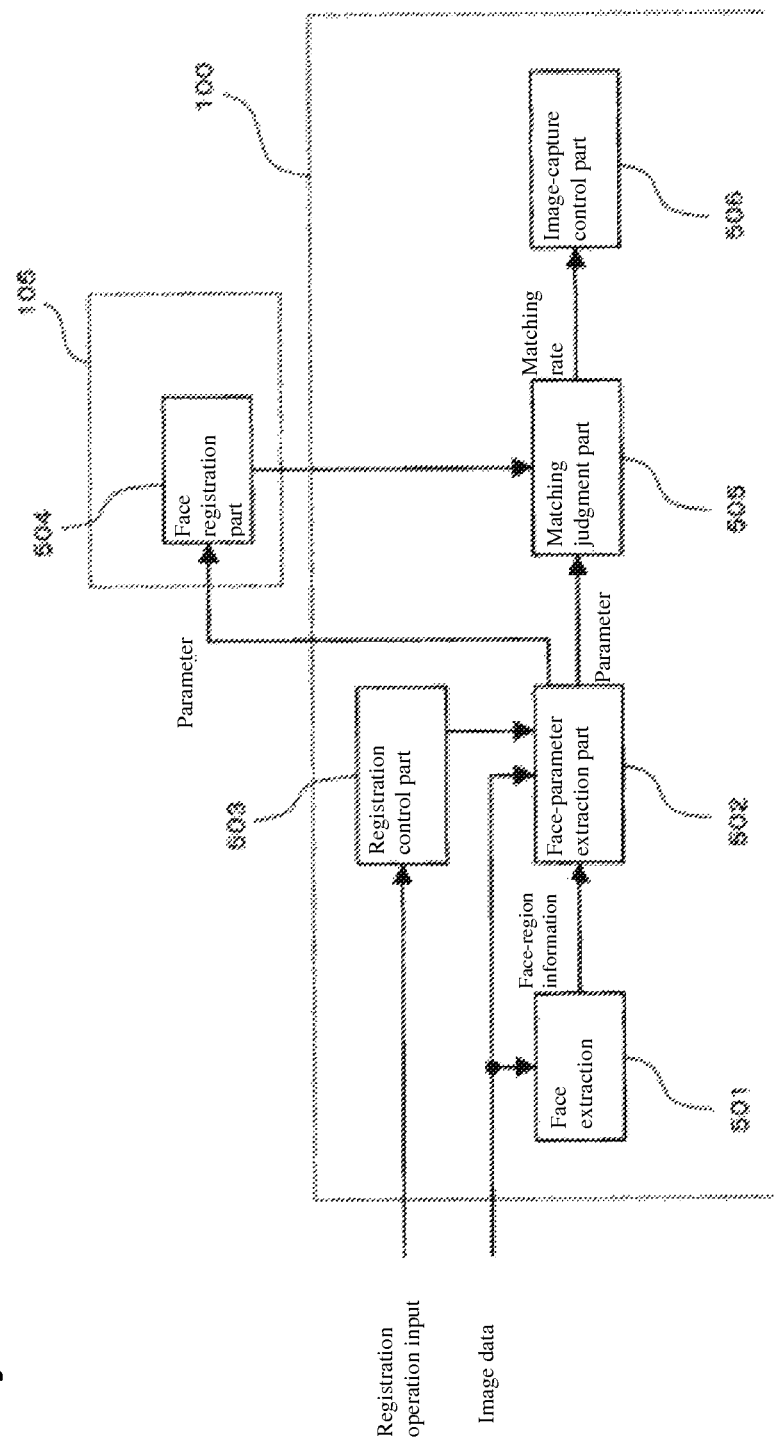
FIG. 3 is a functional block diagram for realizing a remote image-capture mode according to one embodiment.

FIG. 3 is a functional block diagram for realizing the remote image-capture mode.

In order to realize the remote image-capture mode, the CPU 100 and the memory 105 comprise a face extraction part 501, a face-parameter extraction part 502, a registration control part 503, a face registration part 504, a matching judgment part 505, and an image-capture control part 506.

The face extraction part 501, the face-parameter extraction part 502, the registration control part 503, the matching judgment part 505 and the image-capture control part 506 are realized as functions of software executed by the CPU 100. Part of the storage area of the memory 105 is allocated to the face registration part 504.

Image data output from the camera module 13 are input into the CPU 100 via the video encoder 101, and these image data are obtained by the face extraction part 501 and the face-parameter extraction part 502.

The face extraction part 501 obtains image data for one screen (i.e., for one frame) per one frame or several frames, and based on the image data, extracts the region of a face image (face region) contained in the image. For example, by detecting skin color within an image as well as characteristic parts such as the eyes, nose and mouth based on the shading, etc. of the image, the face extraction part 501 extracts a face region. Then, it outputs information for identifying the face region (e.g., positional information of the outline of the face) (hereinafter referred to as "face-region information") to the face-parameter extraction part 502. If there are multiple face images within a single image, the face extraction part 501 extracts all of the face regions.

At the same timing as the face extraction part 501, the face-parameter extraction part 502 obtains image data for one screen, and based on the face-region information sent from the face extraction part 501, extracts parameters for distinguishing the face image from the image data corresponding to the face region. Examples of parameters include the respective shapes of parts such as the eyes, nose and mouth, the ratios of the distances between each part, and skin color, etc.

In this way, the face-parameter extraction part 502 extracts parameters of each face image for all of the face regions that have been extracted by the face extraction part 501, and outputs the parameters to the matching judgment part 505.

The matching judgment part 505 cross-checks the face-image parameters that have been sent with the face-image parameters registered in the face registration part 504, and calculates the matching rate (conformance rate) with the registered face image.

Registration of face-image parameters in the face registration part 504 is performed by the registration control part 503. After receiving a user input of a registration operation, the registration control part 503 instructs the face-parameter extraction part 502 to send parameters to the face registration part 504. After receiving this instruction, the face-parameter extraction part 502 sends the face-image parameters extracted at that moment to the face registration part 504. In this way, face-image parameters are registered in the face registration part 504.

The matching judgment part 505 calculates the matching rate of all of the extracted face regions with respect to the face images and outputs the results to the image-capture control part 506.

By comparing the sent matching rate to a preset threshold value, the image-capture control part 506 determines whether a registered face image is present in the image, and performs an image-capture process based on the determined result.

Figure 4:
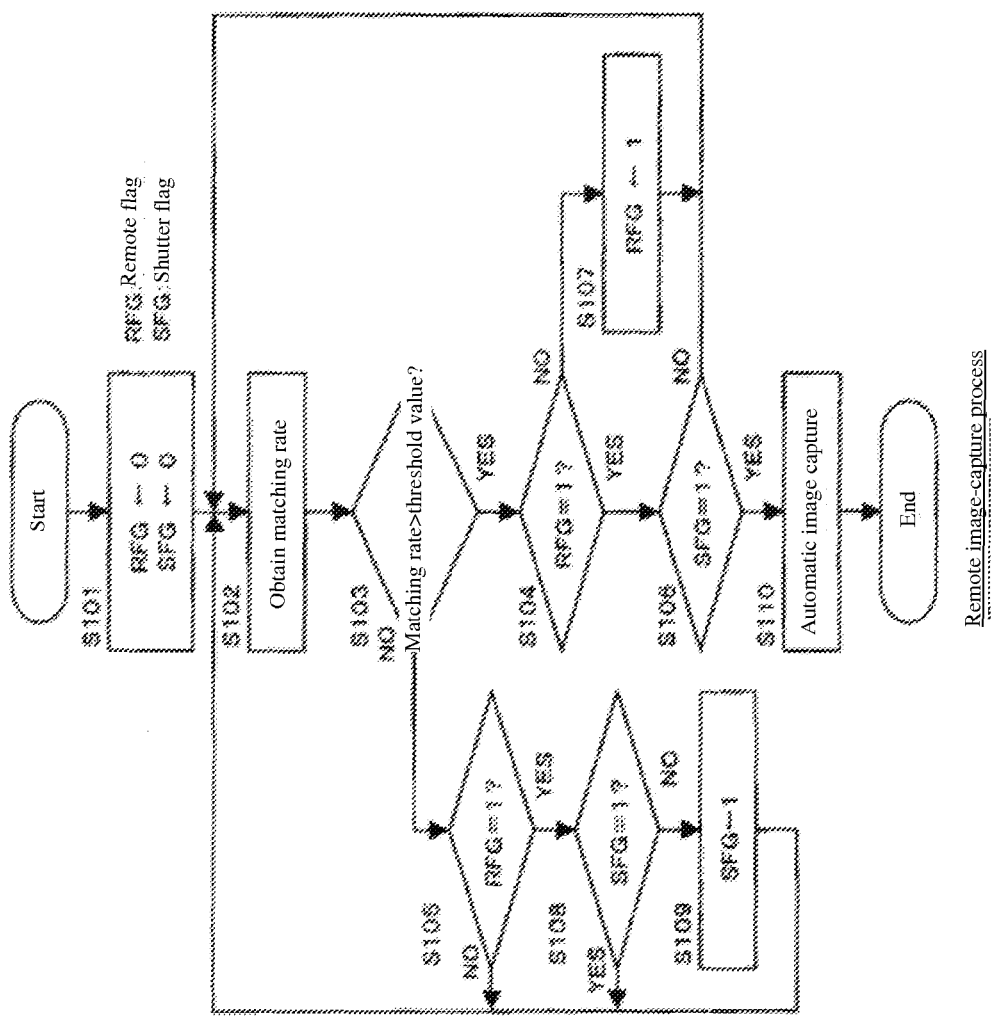
FIG. 4 is a diagram showing the process flow of an image-capture process executed in a remote image-capture mode according to one embodiment.

FIG. 4 is a diagram showing the process flow of an image-capture process executed in a remote image-capture mode.

Figure 5A:
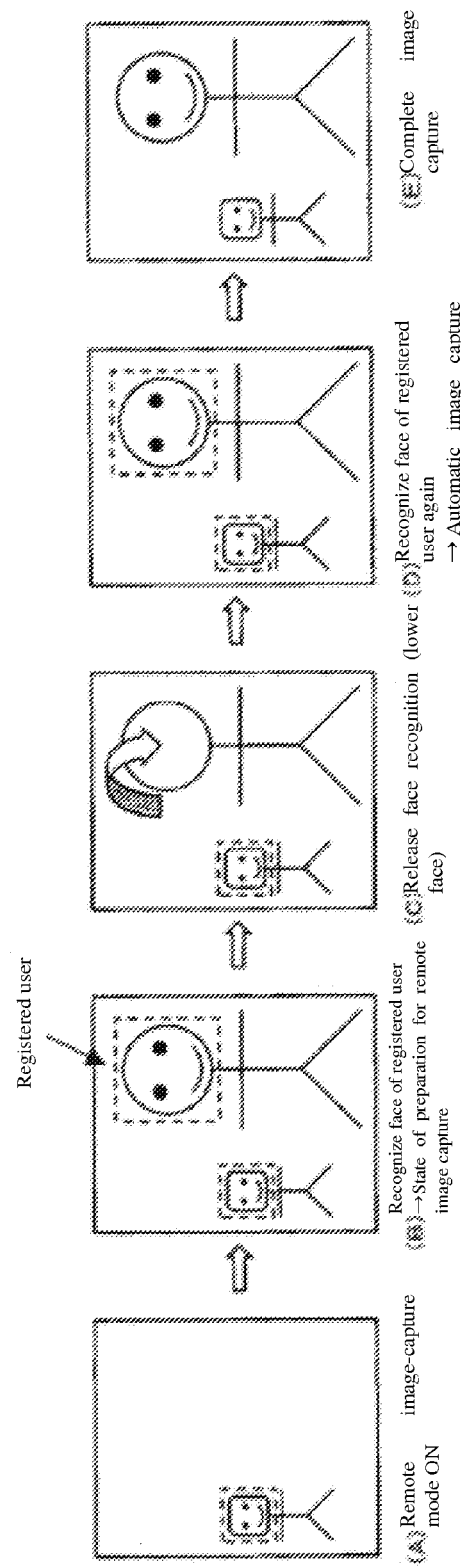
FIG. 5A is an explanatory diagram of the flow in a remote image-capture mode according to one embodiment.
Figure 5B:
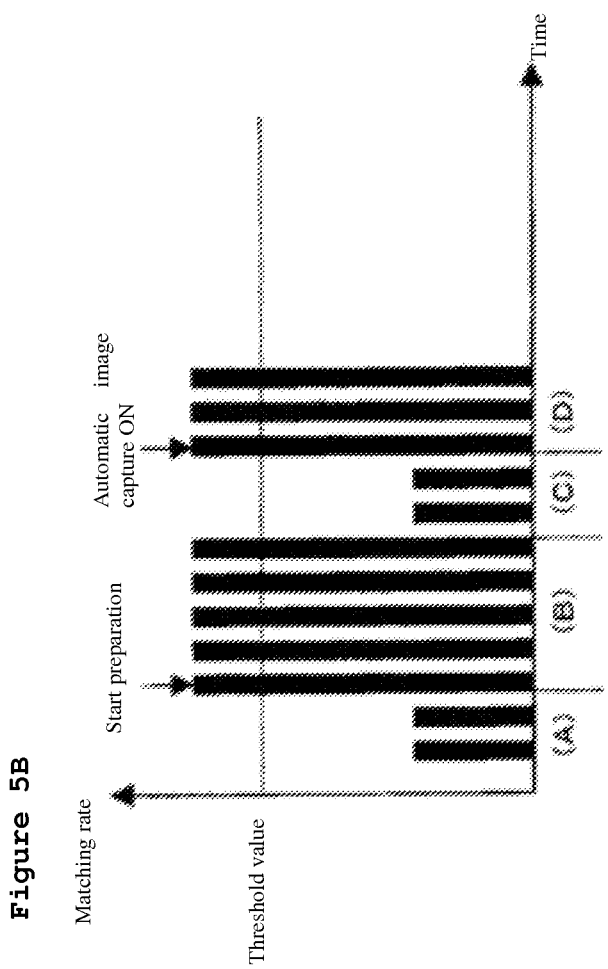
FIG. 5B is an explanatory diagram of shifts in a detected matching rate and related control actions according to one embodiment.

FIG. 5A is a diagram using illustrated images to show the operational flow from the activation of the remote image-capture mode to the completion of image capture. FIG. 5B is a diagram showing shifts in the detected matching rate and the flow of related control actions. In the bar graph of the matching rate shown in FIG. 5B, as a matter of convenience, the bars for the face images of the same person are portrayed as being constantly at the same height, but because the matching rate varies even for the face image of the same person due to slight changes such as changes in orientation, the height of the bars would actually differ slightly. The following is a description of the control actions with reference to these drawings.

First, before using the remote image-capture mode, the user performs operations to register their own face image. While the user is captured by the camera module 13, when the user or another person performs registration operations, the registration control part 503 operates as described above, and the face-image parameters of the user are registered in the face registration part 504. Consequently, the user is able to set the remote image-capture mode.

Furthermore, instead of performing image capture during registration as described above, it is also possible to use a configuration in which face-image parameters are extracted from an image that has been preliminarily captured and stored in the memory 105 and registered in the face registration part 504.

Next, when the user performs a key operation for remote image-capture mode, the remote image-capture mode is activated.

When the remote image-capture mode is activated, the face extraction part 501, the face-parameter extraction part 502, and the matching judgment part 505 are constantly operating while the mode is active, and the matching rates of all of the face images in one image are output from the matching judgment part 505 to the image-capture control part 506 in a set time interval (interval of one or more frames).

The image-capture control part 506 first resets the remote flag (RFG) and the shutter flag (SFG) as part of initial setting.

Next, the image-capture control part 506 obtains the matching rates of the face images in a single image (S102), compares the obtained matching rates with a threshold value for each screen, and determines whether any exceed the threshold value (S103).

If the user who has registered their face image (hereinafter referred to as "registered user") has not entered the image-capture region of the camera module 13 (screen (A) in FIG. 5A), even if other people are in the image and their face images have been extracted, the matching rates are low values (time region (A) in FIG. 5B).

In this case, the image-capture control part 506 determines that there is no face image with a matching rate that exceeds the threshold value (S103: NO), and because the RFG remains reset (S105: NO), the process returns to step S102, and the matching rates of the face images of one image that are sent next are obtained.

Subsequently, when the registered user enters the image-capture region (screen (B) in FIG. 5A), the face image of the registered user is extracted. Then, the matching rate of that face image becomes a high value (time region (B) in FIG. 5B).

As a result, the image-capture control part 506 determines that there is a face image with a matching rate that exceeds the threshold value (S103: YES), and causes the RFG that is in a reset state to enter a set state (S104:NO→S107). As a result, it enters a state of preparation for remote image capture. Subsequently, the image-capture control part 506 returns to the process of step S102, and obtains the matching rates of the face images of one image that are sent next.

After preparing for image capture, the registered user who has reached the image-capture position performs an operation to perform image capture. Specifically, as a signal for an instruction for image capture, the user performs a movement to hide their face once and then reveal it again. For example, the registered user performs a movement to lower their face once and then returning to the initial position (screens (C)→(D) in FIG. 5A). When the registered user performs a movement to hide their face, because the face image is no longer extracted, there is no longer a face image with a matching rate that exceeds the threshold value, and when the user performs a movement to reveal their face again, the face image with a matching rate that exceeds the threshold value is revealed again (time regions (C)→(D) in FIG. 5B).

In the state of preparation for remote image capture, when the image-capture control part 506 determines that there is no face image with a matching rate that exceeds the threshold value (S103: NO), because the RFG has been set (S105: YES) and the SFG remains in the reset state (S108: NO), the SFG is set (S109).

Subsequently, when the image-capture control part 506 again determines that there is a face image with a matching rate that exceeds the threshold value (S103: YES), because the RFG and the SFG are both in a set state (S104: YES→S106: YES), automatic image capture is started (S110).

The image-capture control part 506 performs a shutter operation after, for example, a fixed delay time (e.g., 3 seconds) has passed, and cause the image data of the captured image by the camera module 13 at the time to be stored in the memory 105. At this time, in order to notify the user, etc. that the image will be taken, a notification sound such as "beep, beep, beep, click" may be output from the speaker 109. In conjunction with the notification sound, or instead of the notification sound, it is also possible to cause a light-emitting part such as an LED to emit light, or to change the display state of the display 21.

Furthermore, the operations for automatic image capture are not limited to those described above, and it is possible to perform the shutter operation immediately without waiting for the passage of the above delay time. If an auto-focus function is provided, it is also possible to perform the shutter operation after adjusting the focus.

In this way, image capture is completed (screen (E) in FIG. 5A). If image capture is to be continued, the registered user performs a movement to hide their face and then reveal it, just as described above. As a result, the image-capture process is executed (step S103: YES→S104: YES→S106: YES→S110), and the image data of the newly captured image are stored in the memory 105.

Subsequently, when the user performs a key operation to release the remote image-capture mode, the remote image-capture mode is stopped.

According to the present embodiment, the registered user is able to perform photography (image storage) at a desired timing that they indicate simply by performing a movement to hide their own face and reveal it again. Because a remote control is not required, even if one forgets to bring the remote control, there is no concern that remote image capture cannot be performed.

Consequently, it is possible to realize a cellular phone with excellent camera operability.

Second Practical Example of the Present Invention

In the above embodiment, if a face image with a matching rate exceeding the threshold value is present in the image at every detection timing point, it is deemed that the registered user is present in the image-capture region. For this reason, when there is a person resembling the registered user in the image, even when the face image of the registered user disappears, if the face image of the resembling person exceeds the threshold value, it is determined that the face image of the registered user is present. As a result, even if the registered user performs an image-capture operation, a photograph may not be taken properly.

One method of dealing with that is to set the threshold value to a high value. However, when the image-capture distance of the registered user becomes greater and the extracted face image becomes smaller, the matching rate decreases. Therefore, if the threshold value is too high, the registered user may not be detected. Moreover, because the matching rate varies when the registered user simply changes the orientation of their face, if the threshold value is too high, this may create a situation in which these variations cause the matching rate to hover above and below the threshold value and shutter operations are performed to take photographs unintended by the registered user.

Although the control process becomes complicated compared to the above embodiment, in order to accurately determine whether the face image of the registered user is present, it is possible to use a configuration such as that of Example 1 as described below.

Figure 6:
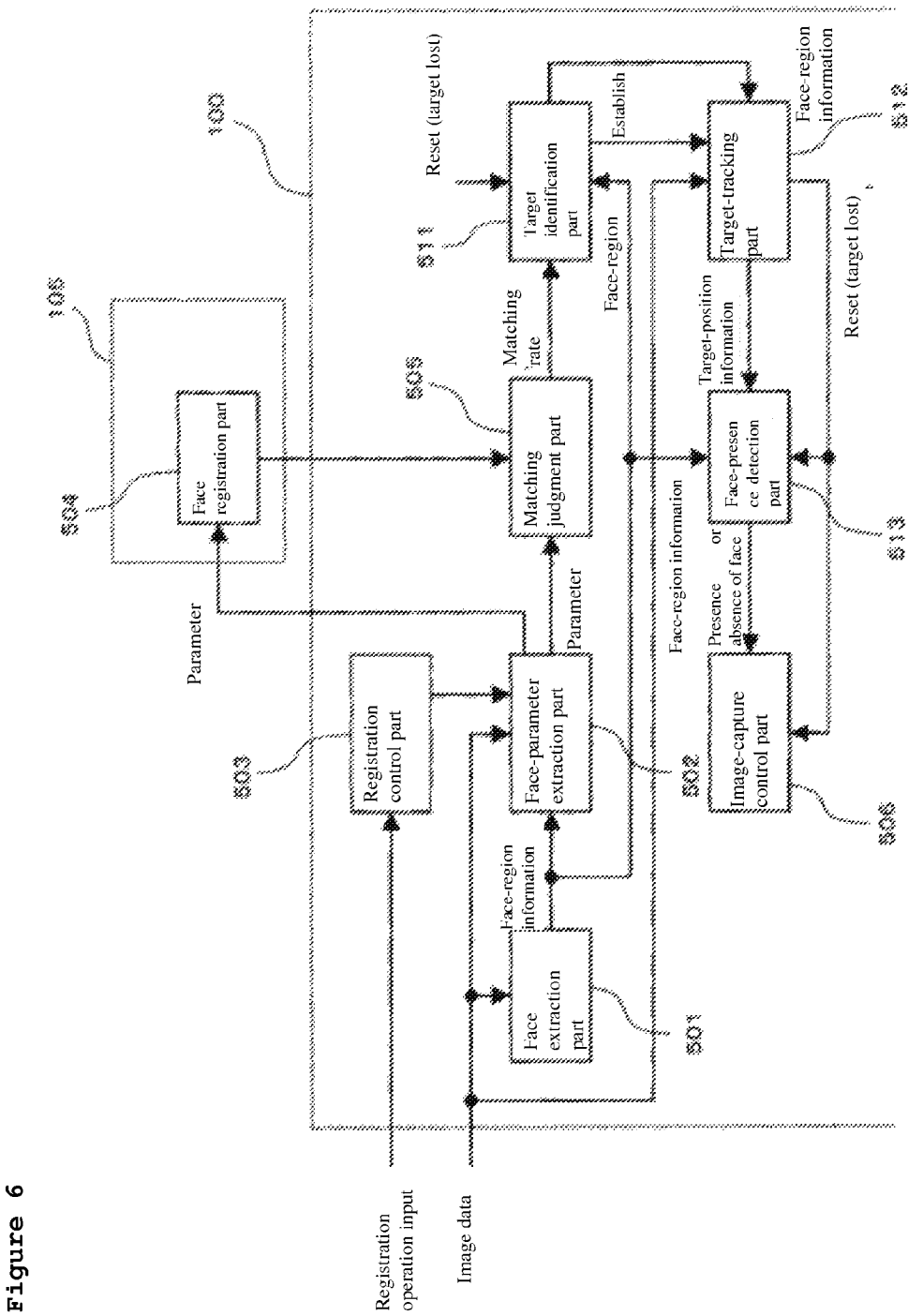
FIG. 6 is a function block diagram for realizing a remote image-capture mode according to one embodiment.

FIG. 6 is a functional block diagram for realizing a remote image-capture mode according to Example 1.

In the present example, a target identification part 511, a target-tracking part 512, and a face-presence detection part 513 are arranged between the matching judgment part 505 and the image-capture control part 506. Other configurations are the same as those of the above embodiment.

Based on the matching rates obtained from the matching judgment part 505 and the face-region information sent from the face extraction part 501, the target identification part 511 identifies which face image of which face region is estimated to be the face image of the registered user, and outputs the face-region information of that face image to the target-tracking part 512.

When receiving the face-region information of the face image of the registered user, the target-tracking part 512 obtains image data from the camera module 13 over a fixed interval (interval of one or more frames) to track the movements of the target face region, and outputs information on the position thereof (hereinafter referred to as "target-position information") to the face-presence detection part 513. For the target-tracking method, a known method using movement vectors (for example, refer to Japanese published unexamined application 2006-323437) may be used, for example.

Based on the face-region information being sent from the face extraction part 501 and the target-position information being sent from the target-tracking part 512, the face-presence detection part 513 detects the presence or absence of the face image of the registered user in the image. If there is face-region information that matches the target-position information (i.e., if a face image is detected at the position of the target being tracked), the face-presence detection part 513 assumes that the face image of the registered user is present in the image and outputs a face-present signal to the image-capture control part 506. On the other hand, if there is no face-region information that matches the target-position information (i.e., if no face image is detected at the position of the target being tracked), it assumes that the face image of the registered user is not present in the image and outputs a face-absent signal to the image-capture control part 506.

Based on the result on the presence or absence of the face detected by the face-presence detection part 513, the image-capture control part 506 performs a prescribed image-capture operation.

Figure 7B:
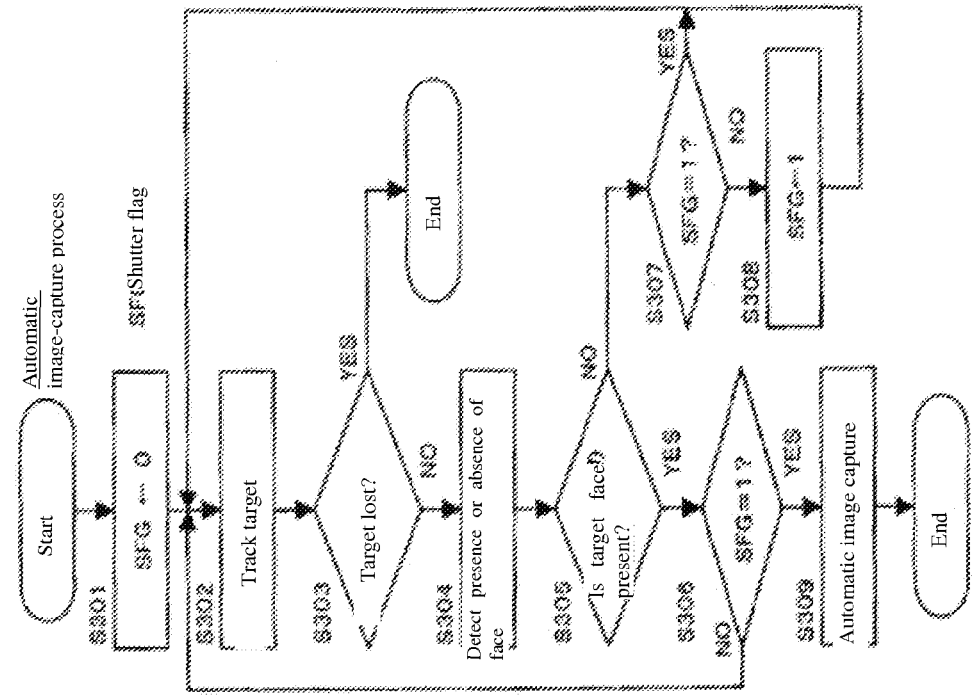
FIG. 7B is a diagram showing the process flow for performing image capture based on the detection results of the presence or absence of the face of a registered user in a remote image-capture mode according to one embodiment.
Figure 7A:
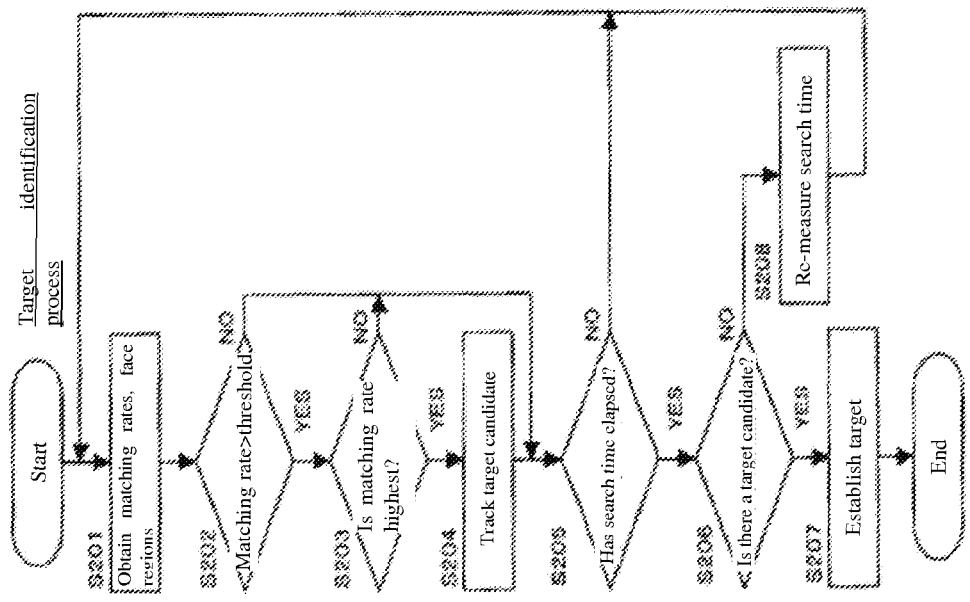
FIG. 7A is a diagram showing the process flow of an image-capture process executed in a remote image-capture mode according to one embodiment.

FIG. 7 is a diagram showing the process flow of an image-capture process executed in the remote image-capture mode according to Example 1. FIG. 7A is a diagram showing the process for identifying the face image of the registered user (target identification process). This target identification process is executed by the target identification part 511 and the target-tracking part 512. FIG. 7B is a diagram showing the process flow of a process for performing image capture based on the detection results of the presence or absence of the registered user (automatic image-capture process). This automatic image-capture process is executed by the target-tracking part 512, the face-presence detection part 513, and the image-capture control part 506. The following is a description of the control actions with reference to FIG. 7.

When the remote image-capture mode is activated, first, the target identification process is performed. The target identification part 511 obtains the matching rates of face images and the face-region information for one screen (S201), and compares the obtained matching rates with a threshold value for each screen to determine whether any exceed the threshold value (S202). Then, if there is a face image that exceeds the threshold value (S202: YES), it determines whether the matching rate of that face image is the highest matching rate obtained since starting the target identification process (S203). If it is the highest matching rate (S203: YES), it determines that the face image is the face image of the registered user, and it sends the face-region information of that face image to the target-tracking part 512. The target-tracking part 512 sets the face region identified by that face-region information as a target candidate, and starts tracking its movements (S204).

The target identification part 511 measures the time from the activation of the remote image-capture mode. In the present example, based on an expected time between when the registered user performs an operation to set the remote image-capture mode and when the registered user moves to an image-capture position, a search time for ultimately identifying the registered user is set.

If the search time has not elapsed (S205: NO), the target identification part 511 returns to the process of step S201, and obtains the matching rates of the face images and the face-region information for one screen that are sent next. In this way, until the search time has elapsed, the processes from step S201 to step S204 are repeated. During this time, whenever a face image with the highest matching rate is detected, the target candidate is updated, and the movements of the updated target candidate are tracked. During this time, if the target candidate disappears from the image, the target-tracking part 512 discontinues tracking and stands by to receive the next face-region information.

In this way, when the search time has elapsed (S205: YES), the target identification part 511 determines whether the target candidate is present (S206). Then, if the target candidate is present (S206: YES), it establishes the current target candidate as the official target (S207) and ends the target identification process. Subsequently, the target-tracking part 512 tracks the established target.

In this way, in the present example, by providing a search time and identifying the face image with the highest matching rate during that time as the face image of the registered user, even if a person resembling the registered user is in the image-capture region, it is possible to reduce the identification of the face image of that person as the face image of the registered user.

On the other hand, if the registered user is unable to enter the image-capture region within the search time due to taking too much time to move, etc., and a target candidate is not identified within the search time (S206: NO), the measurement of the search time is reset (S208), and the process returns to step S201 to repeat operations to search for a target candidate.

When the target identification process is completed, the target identification part 511 sends a signal indicating that the target has been established to the target-tracking part 512. When receiving this establishment signal, the target-tracking part 512 starts the output of target-position information to the face-presence detection part 513.

When the target identification process is completed, the automatic image-capture process is started subsequently. The image-capture control part 506 first causes the shutter flag (SFG) to enter a reset state (S301).

The target-tracking part 512 tracks the face image that has been established as the target (i.e., the registered user) (S302), and if the target does not leave the image-capture region (S303: NO), the target-tracking part 512 outputs the target-position information to the face-presence detection part 513 at the time that the face-region information is output from the face extraction part 501.

As described above, the face-presence detection part 513 detects the presence or absence of the face image of the registered user based on the face-region information sent from the face extraction part 501 and the target-position information sent from the target-tracking part 512, and outputs a face-present signal or a face-absent signal to the image-capture control part 506 (S304).

As in the above embodiment, when the registered user performs a movement to hide and then reveal their face, the face-presence detection part 513 outputs a face-absent signal and then outputs a face-present signal.

When receiving the face-absent signal, the image-capture control part 506 determines that the target face image (i.e., the face image of the registered user) is not present (S305: NO), and because the SFG is in a reset state (S307: NO), it sets the SFG (S308). Then, when receiving the face-present signal, it determines that the face image of the registered user is present (S305: YES), and because the SFG is in a set state (S306: YES), it performs automatic image capture (S309). The operations for automatic image capture are the same as those for the above embodiment.

If the registered user leaves the image-capture region for some reason, the target-tracking part 512 determines that the target has left the image-capture region in step S303 (S303: YES). In this case, the automatic image-capture process is ended, and the target-tracking part 512 outputs reset signals to the target identification part 511, the face-presence detection part 513, and the image-capture control part 506. Based on this, processes for automatic image capture are restarted from the target identification process shown in FIG. 7A.

According to the configuration of the present example, because the movements of a face image determined to be the registered user are tracked, even if a person resembling the registered user is present in the same image, it is possible to accurately detect the presence or absence of the face image of the registered user and properly enter the automatic image-capture process.

Third Practical Example of the Present Invention

When taking a photograph, certain settings and adjustments may be implemented for image capture depending on each specific situation. For example, settings for the use or non-use of the above delay time for automatic image capture, settings for the use or non-use of a flash, or zoom adjustments, etc. may be implemented. The registered user may implement these settings, etc. during or before the implementation of settings for remote image-capture mode, but may also do so after arriving at an image-capture position.

Therefore, the present example has a configuration in which settings, etc. related to image capture can be implemented based on the state of the face of the registered user (whether the face is facing right or left) or the state of other parts (hands, etc.).

Figure 8:
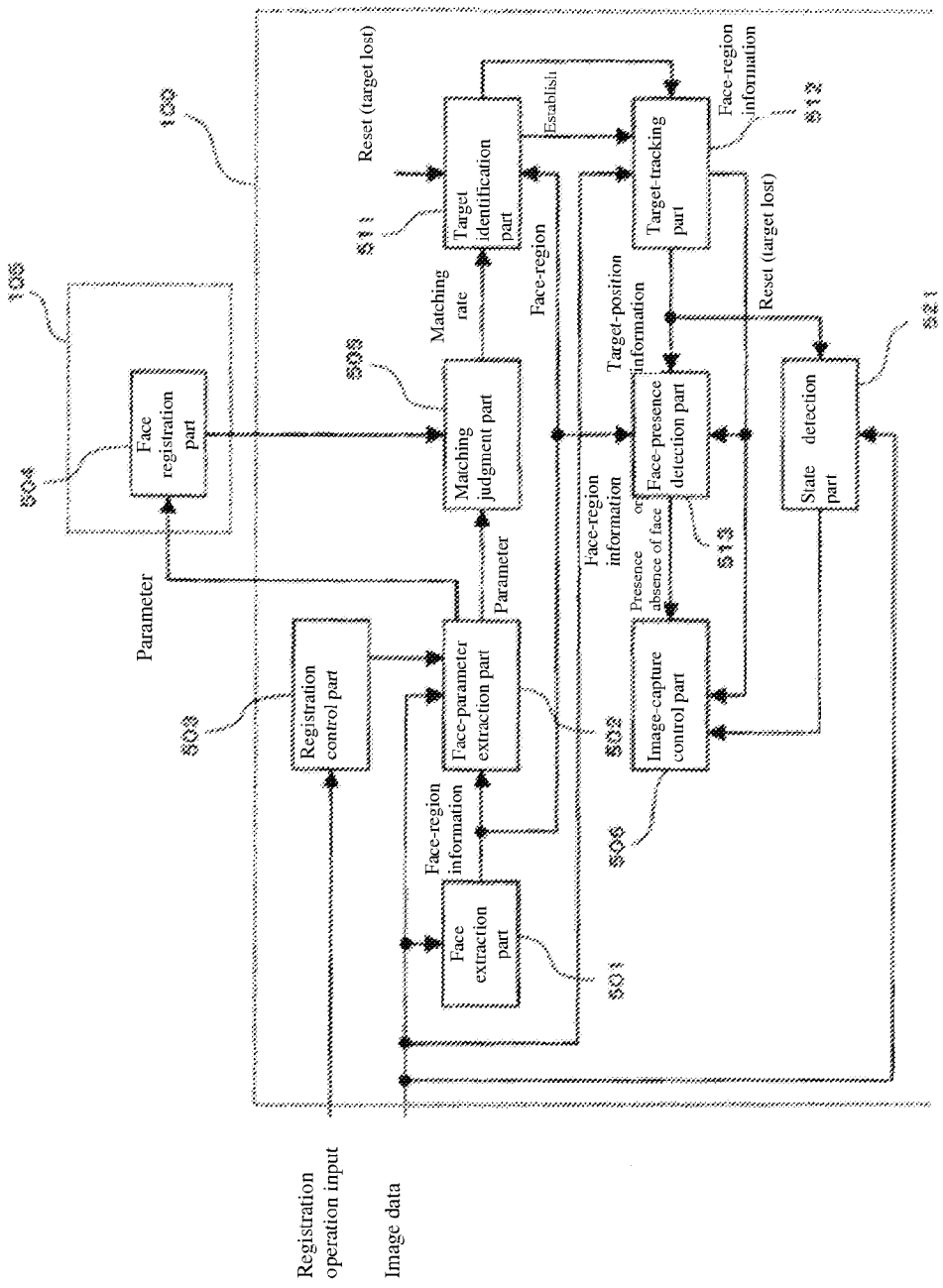
FIG. 8 is a functional block diagram for realizing a remote image-capture mode according to one embodiment.

FIG. 8 is a functional block diagram for realizing a remote image-capture mode according to Example 2. In the present example, a state detection part 521 is added to the functional blocks of Example 1 shown in FIG. 6.

Target-position information related to the face image of the registered user is input into the state detection part 521 from the target-tracking part 512. Moreover, image data are input into the state detection part 521. Based on these inputs, the state detection part 521 detects the state of the face image of the registered user, and outputs instruction signals for settings, etc. according to the state to the image-capture control part 506.

In the state detection part 521, states of the face image and the corresponding instructions are preliminarily set. For example, if the use or non-use of a delay time is set depending on the horizontal orientation of the face, an instruction for using a delay time is set for face images facing leftward, and an instruction for not using a delay time is set for face images facing rightward.

For the method of detecting the orientation of the face, a publicly known detection method such as the method disclosed in Japanese published unexamined application 2000-97676 may be used. In this case, the state detection part 521 detects whether the face image is facing rightward or leftward based on the relative positions of the eyes, nose and mouth, etc. relative to the position of the center of gravity of the skin-color region that is the face region. In other words, if the face of the registered user faces rightward, because the eyes, nose and mouth, etc. in the skin-color region deviate to the right, the state detection part 521 determines that the face is facing rightward, and outputs an instruction signal to use a delay time. On the other hand, if the registered user faces leftward, because the eyes, nose and mouth, etc. in the skin-color region deviate to the left, the state detection part 521 determines that the face is facing leftward, and outputs an instruction signal to not use a delay time. Of course, the range of horizontal orientation of the face image is the range in which the face image can be detected by the face extraction part 501.

Upon receiving an instruction signal for settings, etc. from the movement detection part 521, the image-capture control part 506 accordingly performs a process for settings, etc.

Figure 9:
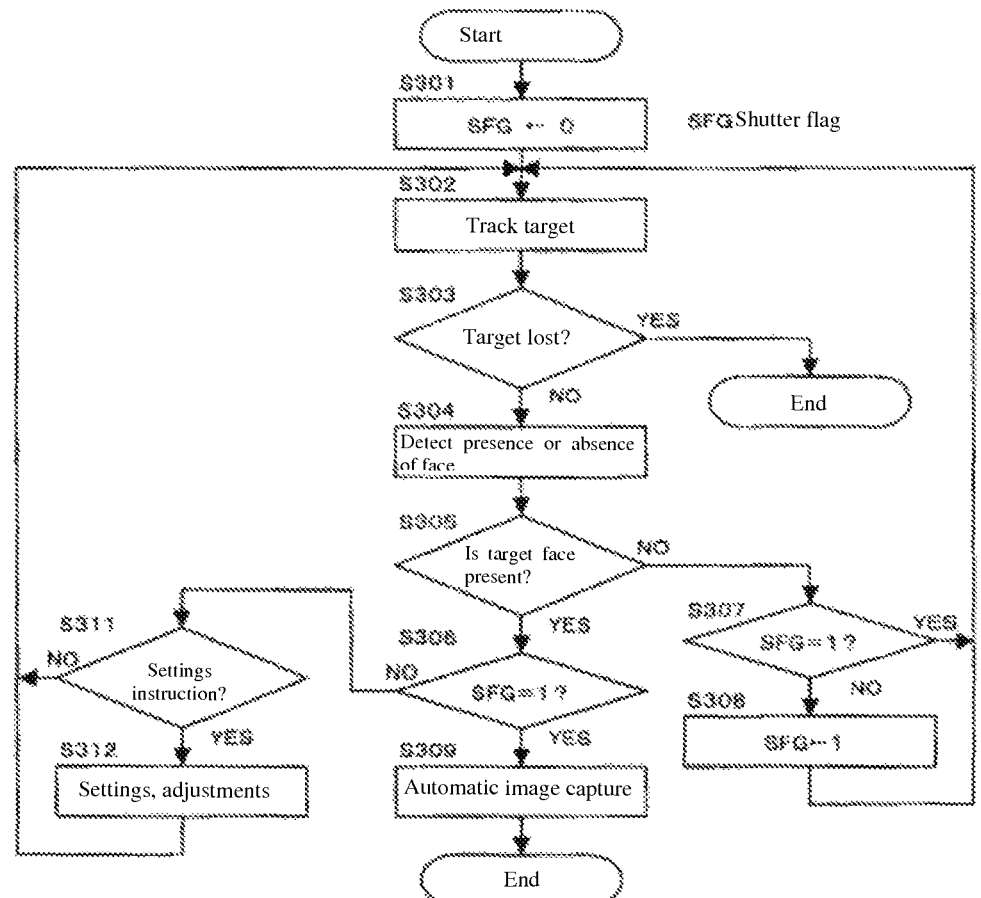
FIG. 9 is a diagram showing the process flow of an automatic image-capture process according to one embodiment.

FIG. 9 is a diagram showing the process flow of an automatic image-capture process according to Example 2. In the process flow shown in this diagram, in order to execute settings, etc. related to image capture, the processes of the steps S311 and S312 executed by the image-capture control part 506 are added to the process flow of FIG. 7.

When determining that the face image is present after the face image of the registered user (target) has been identified (S305: YES→S306: NO), the image-capture control part 506 determines whether there has been an instruction for function setting, etc. from the movement detection part 521 (S311). Then, if there has been an instruction for function setting, etc., a process complying with that instruction is performed (S312).

For example, if the use or non-use of the above delay time is being set, the use of a delay time is set if the face of the registered user faces rightward, and the non-use of a delay time is set if the face of the registered user faces leftward.

According to the configuration of the present example, because it becomes possible for the registered user to implement settings and adjustments related to image capture from a location distant from the cellular phone, the usability improves.

The present example may provide a configuration in which settings, etc. other than the above delay time may be implemented in response to the state of the face image. For example, if a flash function is provided on the cellular phone, the use or non-use of the flash may be set, or if a zoom function is provided, adjustments for zooming in or out may be performed. In this case, it is preferable to provide a function for causing the display 21 to face the same direction as the lens window of the camera in order to allow the subject (registered user) to confirm the zoom conditions.

Moreover, the present example may provide a configuration in which function setting, etc. is implemented in response to the state of parts other than the face, instead of the state of the face. For example, the direction being pointed to by a finger may be detected, and function setting, etc. may be implemented in response to the direction of the finger. In the case of the present example, because this is a configuration in which the face region of the registered user is tracked, if the state of parts other than the face is detected, in order to distinguish whether it is the state of the registered user, it is preferable to use a configuration in which only the state of the surroundings of the face image of the registered user is detected.

Fourth Practical Example of the Present Invention

In the above embodiment and Examples 1 and 2, the setting and release of the remote image-capture mode are performed through a prescribed key operation. Consequently, the registered user performs operations for setting and release each time they use the remote image-capture mode. Therefore, the present example has a configuration in which the setting and release (activation and stopping) of the remote image-capture mode are performed automatically without relying on a key operation.

Figure 10:
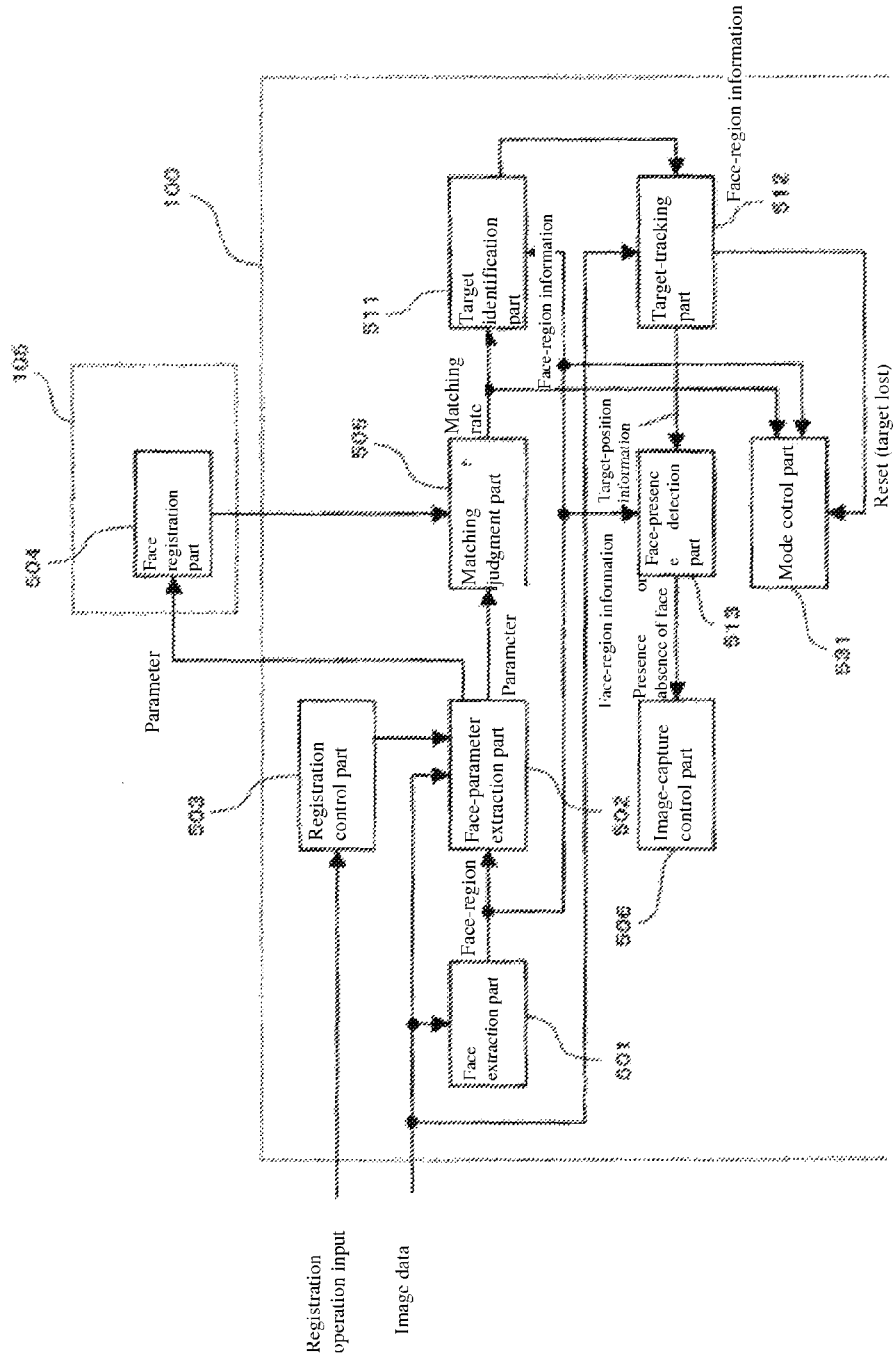
FIG. 10 is a functional block diagram for realizing a remote image-capture mode according to one embodiment.

FIG. 10 is a functional block diagram for realizing a remote image-capture mode according to Example 3. In the present example, a mode control part 531 is added to the functional blocks of Example 1 shown in FIG. 6.

In Example 1, reset signals from the target-tracking part 512 are output to the face-presence detection part 513, the image-capture control part 506, and the target identification part 511, but in the present example, they are output to the mode control part 531.

Moreover, in the present example, even when the remote image-capture mode is not active, the face extraction part 501, the face-parameter extraction part 502, and the matching judgment part 505 are operating, and in the mode control part

531, matching rates from the matching judgment part 505 are input along with face-position information from the face extraction part 501.

When the remote image-capture mode is not active, the mode control part 531 activates the remote image-capture mode based on the input matching rates. Moreover, when the remote image-capture mode is active, it stops the remote image-capture mode based on the input matching rates, face-region information and reset signals.

Figure 11B:
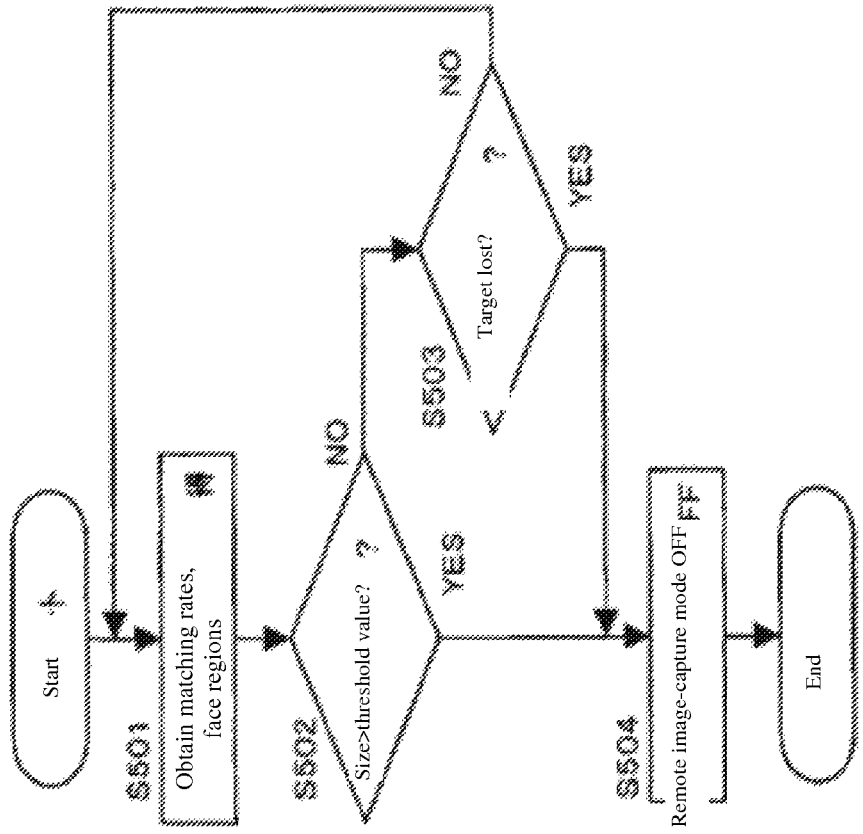
FIG. 11B is a diagram showing the process flow of an automatic release in a remote image-capture mode according to one embodiment.
Figure 11A:
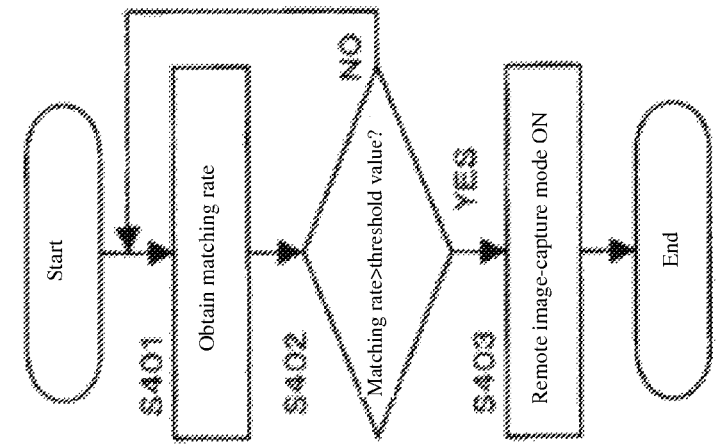
FIG. 11A is a diagram showing the process flow of the automatic settings in a remote image-capture mode according to one embodiment.

FIG. 11 is a diagram showing the process flow for a process for implementing automatic settings and a process for implementing automatic release for a remote-image capture mode according to Example 3. FIG. 11A shows the process flow for automatic settings, and FIG. 11B shows the process flow for automatic release. FIG. 12 is a diagram using illustrated images to show the flow for automatic settings and release for the remote image-capture mode according to Example 3. FIG. 12A shows the flow for automatic settings, and FIGS. 12B and C show the flow for automatic release. The following is a description of the control actions with reference to these drawings.

With reference to FIG. 11A, the mode control part 531 obtains the matching rates of face images for one screen (S401), compares the obtained matching rates with a threshold value for every screen, and determines whether any exceed the threshold value (S402).

If the registered user does not enter the image-capture region to join the photograph, none of the matching rates exceeds the threshold value (S402: NO), and therefore, the remote image-capture mode remains off (screen (A) in FIG. 12A).

On the other hand, if the registered user enters the image-capture region to join the image capture, the matching rate exceeds the threshold value (S402: YES), and therefore, the mode control part 531 determines that the face image of the registered user is present in the image and activates the remote image-capture mode (S403; screen (B) in FIG. 12A).

The present example shifts into a state of preparation for image capture at the same time that the remote image-capture mode is activated. In other words, unlike Example 1, in the present example, the target identification process of FIG. 7A is not performed, the face image that has been determined as exceeding the threshold value in step S402 (if there is more than one, the one with the highest matching rate) is identified as the face image of the registered user, and the face-region information is output to the target-tracking part 512. As a result, the automatic image-capture process of FIG. 7B is performed.

Next, with reference to FIG. 11B, while the remote image-capture mode is active, the mode control part 531 obtains the matching rates and face-region information of the face images for one screen (S501), and determines whether the size of the face region of the face image exceeding the matching rate (i.e., the face image of the registered user) exceeds a threshold value (has expanded) (S502). If the size of the face region does not exceed the threshold value (S502: NO), it determines whether the face region (target) has left the image-capture region (i.e., whether a reset signal has been output from the target-tracking part 512) (S503).

While image capture is being continued, because the registered user does not move significantly away or leave the image-capture region, the size of the face region does not exceed the threshold value (S502: NO), and no reset signal is input (S503: NO). Consequently, in this case, the remote image-capture mode remains active (screen (C) in FIG. 12B, screen (E) in FIG. 12C).

On the other hand, when image capture ends, the registered user faces the cellular phone (camera module 13). At this time, the face image of the registered user comes close to the cellular phone within the image-capture region or leaves the image-capture region.

The mode control part 531 determines that the size of the face region has exceeded the threshold value when the face image comes close to the cellular phone within the image-capture region (S502: YES), and stops the remote image-capture mode (S504; screen (D) in FIG. 12B). Alternatively, when a reset signal is input when the face region leaves the image-capture region (S503: YES), it stops the remote image-capture mode (S504; screen (F) in FIG. 12B).

According to the configuration of the present example, because the remote image-capture mode can be activated and stopped without requiring the registered user to perform key operations each time, it is possible to further improve the operability.

The present example has a configuration in which both the activation and stopping of the remote image-capture mode are performed automatically, but a configuration may be provided in which only one is automatically performed.

Moreover, the present example has a configuration in which the remote image-capture mode is stopped based on determinations of both when the size of the face region of the registered user exceeds a threshold value and when the face region leaves the image, but a configuration may be provided in which a determination is made only for one.

Furthermore, the present example may be applied to the above embodiment shown in FIG. 3 through FIG. 5. However, because the above embodiment does not comprise the target-tracking part 512, the configuration is one in which the remote image-capture mode is stopped only when the size of the face region of the registered user exceeds the threshold value.

Figure 13:
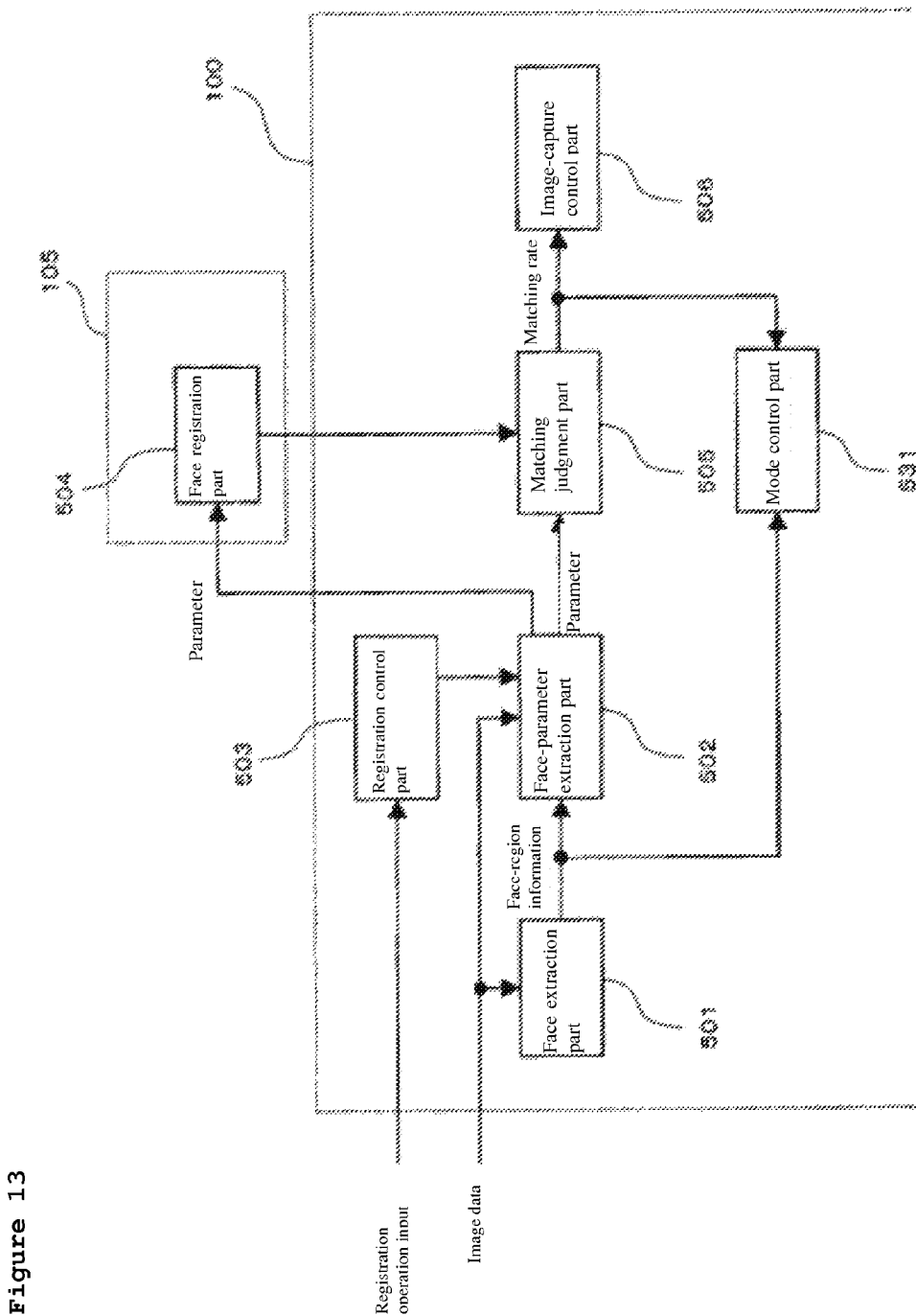
FIG. 13 is a functional block diagram of a case in which the configuration is applied to one embodiment.

FIG. 13 is a functional block diagram showing a case in which the configuration according to Example 3 is applied to the above embodiment. As shown in this diagram, in the mode control part 531, matching rates are input from the matching judgment part 505 along with face-region information from the face extraction part 501.

In this configuration, as the process for activating the remote image-capture mode, the same process as that shown in FIG. 11 is performed. On the other hand, for the process for stopping the remote image-capture mode, the same process as that shown in FIG. 11B is performed, but the process of step S503 is excluded. In this case, the process flow is one in which, when it is determined that the size of the face region does not exceed the threshold value in step S502, the process returns to step S511.

Other

In addition to the above, various changes may be made to the embodiments of the present invention.

For example, the above embodiment has a configuration in which, image data of the captured image are officially recorded in the memory 105 immediately when a shutter operation is performed. However, the present invention is not limited to this configuration, and may have a configuration in which a temporary storage area is provided in the memory 105 or the CPU 100, the captured image is once saved in this temporary storage area when a shutter operation is performed, and then officially stored in the memory 105 when a prescribed save operation is performed by the registered user, etc.

In this way, the memory part of the present invention described within the scope of the patent claims is not limited to a means for officially storing captured images, such as the memory 105 of the above embodiment, and also includes means for temporarily storing captured images, such as the above temporary storage area.

In the above embodiment, an example of a cellular phone with camera was used, but the device with camera of the present invention is not limited to a cellular phone, and may be a PDA (Personal Digital Assistant) with camera or a digital camera, etc.

In addition, the embodiment of the present invention may under various suitable changes within the scope of the technical concepts represented in the scope of the patent claims.

Consequently, the photographer is able to perform photography (image storage) at a desired timing that they intend. Because a remote control is not required, even if one forgets to bring the remote control, there is no concern that remote image capture cannot be performed.

In the device with camera of the present invention, after the face image is no longer detected after the face image is detected by the face detection part, the remote memory part executes a control process to cause the memory part to store the image information based on the renewed detection of the face image.

According to this configuration, when a movement to hide and then again reveal the face of the photographer is performed, a shutter operation is performed based on this movement and the image information is stored.

Consequently, by performing the above movement, the photographer is able to perform photography (image storage) at a desired timing that they intend.

The device with camera of the present invention may have a configuration in which the control process of the remote memory part is activated in response to the face image being detected by the face detection part after image capture by the camera part has been started.

By using such a configuration, because the control process for remote image capture can be activated without requiring the photographer to perform setting operations each time, the operability is improved.

Furthermore, the device with camera of the present invention may have a configuration that further comprises a tracking part that tracks the face image detected by the face detection part in the captured image. In this case, the present invention may have a configuration in which, after the control process executed by the remote memory part has been activated, the control process executed by the remote memory part is stopped in response to the tracking part detecting that the face image has left the captured image.

Alternatively, the device with camera of the present invention may have a configuration in which, after the control process executed by the remote memory part has been activated, the control process executed by the remote memory part is stopped in response to the face detection part detecting that the size of the face image has exceeded a threshold value.

By using such a configuration, because it is possible to stop the control process for remote image capture without requiring the photographer to perform setting operations each time, the operability is improved.

Furthermore, the device with camera of the present invention may have a configuration that further comprises a state detection part that detects the kinetic state of a person who is the subject of the face image detected in the captured image by the face detection part. In this case, the present invention may have a configuration in which the remote memory part performs function setting related to image capture according to the kinetic state.

By using such a configuration, the photographer becomes able to perform function setting for image capture from a location separated from the equipment.

According to the practical examples of the present invention, it is possible to provide a device with camera that realizes excellent operability allowing shutter operations to be performed at a desired timing.

The effects and significance of the present invention are made clear in the descriptions of the embodiment above. However, the following embodiment is only one example for implementing the present invention, and the present invention is not limited by the following descriptions of the embodiment.

INDUSTRIAL APPLICABILITY

The present invention is related to a device with camera, and may be used for a device with camera that performs a shutter operation at a desired timing.

What is claimed is:

1. A device with camera, comprising:
a camera part configured to output a captured image as image information;
a memory part configured to store the image information and previously registered face information corresponding to a registrant's face;
a face detection part configured to detect information regarding a face image from the captured image; and
an image-capture control part configured to execute a control process to cause the memory part to store the image information based on the detection of the face image, wherein the control process comprises a remote image capture mode in which
the captured face image is compared to the previously registered face information to detect whether the captured face image matches the registrant's face, and
a camera shutter operation is performed in response to detecting that the face image matches the registrant's face, and a predetermined change in the captured image has occurred,
the control process further comprising, when the face image matches the registrant's face and a size of the face image detected by the face detection part becomes greater than a predetermined threshold after the remote image capture mode is started, ending the remote image capture mode.

2. The device with camera according to claim 1, wherein the image-capture control part executes the control process to cause the memory part to store the image information based on a renewed detection of the face image after the face image is no longer detected after the face image is initially detected by the face detection part.

3. The device with camera according to claim 2, wherein the control process executed by the image-capture control part is activated in response to the detection of the face image by the face detection part after image capture by the camera part has been started.

4. The device with camera according to claim 3, further comprising:
a tracking part configured to track the face image detected by the face detection part, wherein
in response to the tracking part detecting that the face image is no longer present in a subsequently captured image, after the control process executed by the image-capture control part has been activated, the control process executed by the image-capture control part is stopped.

5. The device with camera according to claim 4, further comprising:

a state detection part configured to subsequently detect a motion of a person who is the subject of the face image detected in the captured image by the face detection part, wherein the image-capture control part performs function setting related to image capture according to the detected motion.

6. The device with camera according to claim 2, further comprising:

a state detection part configured to subsequently detect a motion of a person who is the subject of the face image detected in the captured image by the face detection part, wherein the image-capture control part performs function setting related to image capture according to the detected motion.

7. The device with camera according to claim 3, further comprising:

a state detection part configured to subsequently detect a motion of a person who is the subject of the face image detected in the captured image by the face detection part, wherein the image-capture control part performs function setting related to image capture according to the detected motion.

8. The device with camera according to claim 1, further comprising:

a state detection part configured to subsequently detect a motion of a person who is the subject of the face image detected in the captured image by the face detection part, wherein the image-capture control part performs function setting related to image capture according to the detected motion.

9. The device with camera according to claim 1, further comprising:

a face registration part configured to capture and store face information for one or more registrants in the memory part.

10. The device of claim 1, wherein if the face image corresponds to the previously registered face information, the remote image capture mode is automatically started even if the remote image capture mode was not previously set to an ON state.

11. The device of claim 1, wherein the previously registered face information and the information regarding the face image include face parameters obtained from the registrant's face and the face image, respectively.

12. The device of claim 11, wherein the face image is detected to be the registrant's face if a matching rate of the face parameters is not less than a predetermined threshold value.

13. A device with a camera, comprising:

a camera part configured to output a captured image as image information;

a memory part configured to store the image information and previously registered face information corresponding to a registrant's face;

an image detection part configured to detect information regarding at least one portion of the captured image; and an image-capture control part configured to execute a control process to cause the memory part to store the image information in response to detecting that the information regarding the at least one portion of the captured image matches the registrant's face, wherein when the at least one portion of the captured image matches the registrant's face and a size of the at least one portion detected by the image detection part becomes greater than a predetermined threshold, after the control process executed by the image-capture control part has been activated and after the image information is stored, the control process executed by the image-capture control part is stopped.

14. The device of claim 13, wherein if the at least one portion of the captured image corresponds to the previously registered face information, the control process is automatically started even if the control process was not previously set to an ON state.

* * * * *